United States Patent [19]

Bell et al.

[11] Patent Number: 6,038,400
[45] Date of Patent: Mar. 14, 2000

[54] SELF-CONFIGURING INTERFACE CIRCUITRY, INCLUDING CIRCUITRY FOR IDENTIFYING A PROTOCOL USED TO SEND SIGNALS TO THE INTERFACE CIRCUITRY, AND CIRCUITRY FOR RECEIVING THE SIGNALS USING THE IDENTIFIED PROTOCOL

[75] Inventors: David B. Bell, Los Altos, Calif.; David M. Dwelley, Singapore, Singapore

[73] Assignee: Linear Technology Corporation, Milpitas, Calif.

[21] Appl. No.: 08/534,336

[22] Filed: Sep. 27, 1995

[51] Int. Cl.[7] .................................................. G06F 13/00
[52] U.S. Cl. ......................... 395/831; 395/500; 395/653; 395/834; 395/836; 326/37; 326/38; 326/93
[58] Field of Search .............................. 324/765; 326/38, 326/40, 49, 37, 93; 380/3; 395/309, 310, 800, 500, 829, 836, 653, 831, 834; 235/462; 359/154; 370/257

[56] References Cited

U.S. PATENT DOCUMENTS

| | | | |
|---|---|---|---|
| 3,714,635 | 1/1973 | Hamilton et al. | 395/500 |
| 3,986,051 | 10/1976 | Okada et al. | 327/487 |
| 4,390,963 | 6/1983 | Puhl et al. | 395/309 |
| 4,432,049 | 2/1984 | Shaw et al. | 395/800 |
| 4,500,933 | 2/1985 | Chan | 360/69 |
| 4,902,917 | 2/1990 | Simpson | 326/38 |
| 4,967,346 | 10/1990 | Freidin | 395/500 |
| 4,972,470 | 11/1990 | Farago | 380/3 |
| 5,121,482 | 6/1992 | Patton | 395/836 |
| 5,305,317 | 4/1994 | Szczepanek | 370/257 |
| 5,347,113 | 9/1994 | Reddersen et al. | 235/462 |
| 5,386,518 | 1/1995 | Reagle et al. | 395/310 |
| 5,457,784 | 10/1995 | Wells et al. | 395/829 |
| 5,528,162 | 6/1996 | Sato | 324/765 |
| 5,528,169 | 6/1996 | New | 326/40 |
| 5,546,211 | 8/1996 | Devon | 359/154 |
| 5,557,219 | 9/1996 | Norwood et al. | 326/49 |
| 5,574,722 | 11/1996 | Slykhouse et al. | 370/257 |

OTHER PUBLICATIONS

"I²C Bus Specification," Signetics, Dec. 1988, pp. 4-1-4-13.
"Micropower 8-Bit Current Output DAC," Initial Release, LTC 1329, Linear Technology, Mar. 1995, pp. 1–8.
"Digitally Adjustable LCD Bias Supply," MAX749, Maxim Integrated Products, pp. 4–149–4–159.

*Primary Examiner*—Thomas C. Lee
*Assistant Examiner*—Chien Yuan
*Attorney, Agent, or Firm*—Fish & Neave; Michael J. DeHaemer, Jr.

[57] ABSTRACT

Interface circuitry for an integrated circuit is provided, which can operate in accordance with any one of several different protocols. Protocol identifying circuitry within the interface monitors signals passed from a master/host device to the integrated circuit. Based upon the characteristics of the signals, the protocol being used by the master/host device can be determined, and the interface circuitry on the integrated circuit may be configured accordingly. The protocol identifying circuitry "remembers" which protocol is in use, so that the interface circuit remains configured for the correct protocol regardless of subsequent changes in the signals from the master/host device.

37 Claims, 5 Drawing Sheets

SELF-CONFIGURING INTERFACE CIRCUITRY, INCLUDING CIRCUITRY FOR IDENTIFYING A PROTOCOL USED TO SEND SIGNALS TO THE INTERFACE CIRCUITRY, AND CIRCUITRY FOR RECEIVING THE SIGNALS USING THE IDENTIFIED PROTOCOL

BACKGROUND OF THE INVENTION

The present invention relates to methods and circuitry for interfacing integrated circuits to other devices within a computer system. More particularly, the invention relates to methods and circuitry by which an integrated circuit may automatically configure itself to use any one of several known interface techniques and protocols.

Many digital and analog integrated circuit devices are controlled by means of digital data which is written to or read from registers within the integrated circuit by another device. Data written to a register may specify an operational mode or configuration of the integrated circuit, for example, by selecting an input channel in an analog-to-digital converter (ADC), or by providing output information such as an output level of a digital-to-analog converter (DAC). Alternatively, the data in a register may represent a value to be read by a processor, for example, the current date and time maintained by a real time clock (RTC) integrated circuit. Still other integrated circuit devices, such as non-volatile random access memory (NVRAM), are used to provide storage for configuration information or other important data for other devices in a system even when the system itself is turned off.

Data typically is written to or read from a register of an integrated circuit device by signals passed between the integrated circuit and another device, such as a microprocessor or signal processor, in accordance with a predetermined protocol. Interface circuitry in the integrated circuit device interprets the signals according to this protocol, which defines the meaning of the various signals and the relationships between them. In systems requiring a high data bandwidth, integrated circuits are frequently designed with parallel interfaces, wherein multiple bits of data are transferred between the integrated circuit and a processor simultaneously, as part of a single transaction. However, the trend toward smaller packages and increased circuit density in electronic devices places a high premium on printed circuit board area and integrated circuit pins, and consequently, on the number of signal lines required to interface various integrated circuits to each other. Thus, parallel interfaces may not be cost effective in low data rate applications. For these and other reasons, serial interfaces and protocols have become popular methods of interconnecting integrated circuits and processors within a computer system.

Several serial protocols have been developed which address a wide range of serial interfacing needs, and which offer various trade-offs between hardware and software complexity. As in any design process, a system designer working with integrated circuit devices must balance costs and benefits when selecting the specific devices to be used in the system. One consideration in this balance is the protocol by which the devices communicate.

One known type of multi-wire serial interface protocol, commercial embodiments of which include the SPI (Motorola) and MICROWIRE (National Semiconductor) protocols, provides for synchronous, bi-directional communications between a single master device (e.g., a processor) and a selected slave device. A detailed description of the SPI interface protocol is provided in Section 6 "Serial Peripheral Interface (SPI)" of the "Motorola MC68HC11A8 Data Book," Motorola, 1988. The interface protocol uses four signals which include chip select (/CS), clock (CLK), data input (DIN), and data output (DOUT). A specific device is selected by a host processor asserting the /CS line, while pulses provided on the CLK line synchronize the transfer of data from the processor to the target device (on the DIN line), or from the device to the processor (on the DOUT line). If bi-directional communication is not required for a particular application, either the DIN or DOUT signal may be omitted, thus reducing the total number of signals required to implement the interface protocol.

The "/" symbol is used herein to indicate the logical complement of a signal. Other symbols may be seen in the art to indicate logical complement including a minus ("–") placed before a signal name, or a bar (" ‾ ") placed over the signal name. When used with the name of an input signal, such as /CS, the complement symbol indicates that the line is considered active when a low signal is placed on the line. In the drawings, this is also indicated by a small circle on the input. When the "/" symbol is used with the name of an output signal, it means that the signal is the complement of the signal having the same name without the "/" symbol. For example, the /Q output of a flip-flop is the complement of the Q output of the same flip-flop. Thus the /CS signal of the preceding paragraph is asserted by driving it low.

Another known serial interface protocol is the Inter-Integrated Circuit (I$^2$C) Bus protocol, which is described in detail in "Signetics Microcontroller User's Guide", 1988, pages 4-1 through 4-12. This protocol is a two wire bi-directional, synchronous serial interface between multiple integrated circuit devices. A bus master device controls the Serial CLock (SCL) line while address and data bytes are transferred on the Serial DAta (SDA) line. Unlike the SPI interface protocol, I$^2$C does not use a /CS line to designate the integrated circuit participating in a transaction; rather, addressing information is transmitted on the SDA line as part of the transaction. Thus devices interfaced using I$^2$C must have enough "intelligence" to recognize and respond when their own address is sent on the SDA line.

Microprocessors are known in which general purpose I/O pins may be configured to function as a dedicated serial port according to a predetermined protocol. For example, there is a variant of the 8051 microprocessor in which some I/O pins may be configured as an SPI port, and another variant of the 8051 microprocessor in which some I/O pins may be configured as an I$^2$C port. However, neither of these variants of the 8051 allows the same I/O port to be configured selectively as either an SPI or I$^2$C port. The I/O pins of the microprocessor are configured by programming an internal configuration register, typically during execution of start-up code following a microprocessor reset.

Both the SPI and I$^2$C protocols provide a host processor with a high degree of flexibility and control in communications with another integrated circuit device. However, both SPI and I$^2$C are relatively complex protocols and many applications are better suited for simpler, less costly, interface protocols.

One very simple serial interface protocol (the "increment-only" protocol) requires only a single signal line. The signal line is used to send clock pulses. According to this protocol, an integrated circuit contains a counter whose value is incremented by some predefined amount every time a clock pulse is received. In order to increase the value stored in the counter, a controlling processor sends an appropriate number of clock pulses to the integrated circuit. For example, to increment the counter by twelve when each clock pulse increments the counter by four, the processor sends three clock pulses to the integrated circuit.

Decrementing the counter's value is accomplished by letting the counter "roll over" from a maximum possible value, to a minimum possible value. To reduce a value stored in the counter, the processor must send a sufficient number of pulses to cause the counter to roll over, and then send the correct number of clock pulses to increment the counter to the new desired value. For a counter having many bits, a large number of pulses must be sent to the integrated circuit in order to cause the counter to roll over. If the counter has m bits, a total of $2^m-1$ clock pulses must be supplied to decrement the counter by one. Thus the simplicity of the interface protocol may be offset by the expense of increased complexity of the controlling software. Furthermore, because of the time needed to communicate information, this protocol may be inappropriate for "real time" applications.

Another known, relatively simple, serial interface protocol refines techniques of the increment-only protocol by introducing a direction signal, also referred to as an "increment/decrement", or "up/down", signal. As in the increment-only protocol, clock pulses sent by a processor cause a counter within the integrated circuit to change by a predetermined amount. However, the direction signal is used to indicate the direction of the change. For example a high signal on the direction line may cause the counter to increment when a clock pulse is received, whereas a low signal on the direction line causes the counter to decrement with each clock pulse. The addition of a direction signal provides a host processor with a more direct means of controlling the value of the counter within the integrated circuit, thereby simplifying the software needed to control the integrated circuit.

The protocols discussed thus far are all synchronous protocols, i.e., an action or data transfer occurs in synchronization with a pulse on a clock line. Asynchronous protocols, on the other hand, have no explicit clock signal, relying instead on special formats for framing and transmitting data to synchronize the receiving device's internal clock with that of the sending device. The widely used RS-232 protocol is one example of an asynchronous serial protocol. The advantage of an asynchronous protocol is that only one or two data lines are required, depending upon whether a bi-directional data line is used, and no explicit clock signal is required. These characteristics make asynchronous protocols better suited for long distance communications in which providing a clock signal line requires considerable expense.

Each of the protocols described herein has associated limitations and drawbacks which must be taken into account when an electronic system, such as a computer or embedded control system, is being designed. The design process, which involves balancing the trade-offs among different competing designs, is frequently an iterative process, possibly requiring a system designer to switch from one protocol to another when designing the interface between a processor and a supporting integrated circuit device. For example, in a system using an SPI interface protocol to communicate with a DAC, the addition of a new feature to the system may require the dedicated use of another processor I/O pin. If no more I/O pins are available, the designer may have to add an external register to increase the number of I/O pin available to the microprocessor. Historically, this has been the most common technique, since the desired peripheral functions are generally not available with a variety of interface protocols. If adding an external register is not a desirable design choice, the designer may be forced to switch to an "up/down" style interface protocol between the processor and the DAC in order to make a pin available. Currently, such a design change requires the designer to replace the DAC supporting the SPI protocol with a different DAC which supports the up/down protocol. Often, the pin configuration of the new DAC using the up/down protocol differs from the previous DAC which used the SPI protocol, thus necessitating a re-layout of the printed circuit board, as well as other potential changes to the system design.

Additionally, to offer its customers a variety of interface options integrated circuit manufacturers must provide multiple versions of an integrated circuit design, each version supporting one of the interface protocols. This leads to a proliferation of integrated circuit devices having similar functionality, but each having a unique part number. Thus a customer must be familiar with the variations of each design and must purchase and inventory a large number of unique parts. Likewise, manufacturers must maintain an inventory of many unique parts, resulting in increased costs.

In view of the foregoing it would be desirable to be able to provide in an integrated circuit, interface circuitry which can be configured to use any one of several different interface protocols, so that the same integrated circuit may be used regardless of which interface protocol is selected.

It would further be desirable to be able to provide in an integrated circuit, interface circuitry which is configurable to operate in accordance with any one of several protocols without adding pins solely for the purpose of configuring the interface.

It would also be desirable to be able to provide in an integrated circuit, interface circuitry which automatically configures itself to use a particular protocol in response to signals received from a host device.

It would, in addition, be desirable to be able to provide in an integrated circuit, interface circuitry which automatically configures itself to use a particular protocol in response to the use of the particular protocol by a master device or processor.

SUMMARY OF THE INVENTION

In view of the forgoing, it is an object of the invention to provide methods and circuitry by which an integrated circuit can be configured to employ any one of several different protocols to interface with other circuitry.

It is a further object of the invention to provide methods and circuitry by which an integrated circuit can be configured to use a selected protocol without increasing the pin count on the integrated circuit to provide configuration pins.

It is yet another object of the invention to provide methods and circuitry by which an integrated circuit may be self-configuring in response to recognition of a protocol being used by a host device.

It is still another object of the invention to provide methods and circuitry by which an integrated circuit may be self-configuring for using a specific protocol in response to a master device or host processor using the specific protocol.

In accordance with the invention, an embodiment of an interface circuitry for a serial port is described which can be configured to operate according to any one of several different protocols. Each protocol has characteristic patterns in and/or relationships between the signals of the protocol which are used as a signature to uniquely differentiate the protocols for which the interface may be configured. Protocol identifying circuitry within the interface circuitry monitors signals received from an external device, to detect the signatures indicative of specific protocols. If a signature is detected, the protocol being used by the host device is determined, and the protocol identifying circuitry provides mode select signals to the interface circuitry of the integrated circuit. The protocol identifying circuitry includes latching circuitry which provides the interface with a "memory" of which protocol is in use, so that the interface circuit remains configured for the correct protocol regardless of subsequent transitions in the signals from the processor. A reset circuit is also provided which places the interface circuitry, as well as other circuitry of the integrated circuit, into a known reset condition.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout and in which.

DETAILED DESCRIPTION OF THE INVENTION

Figure 1:
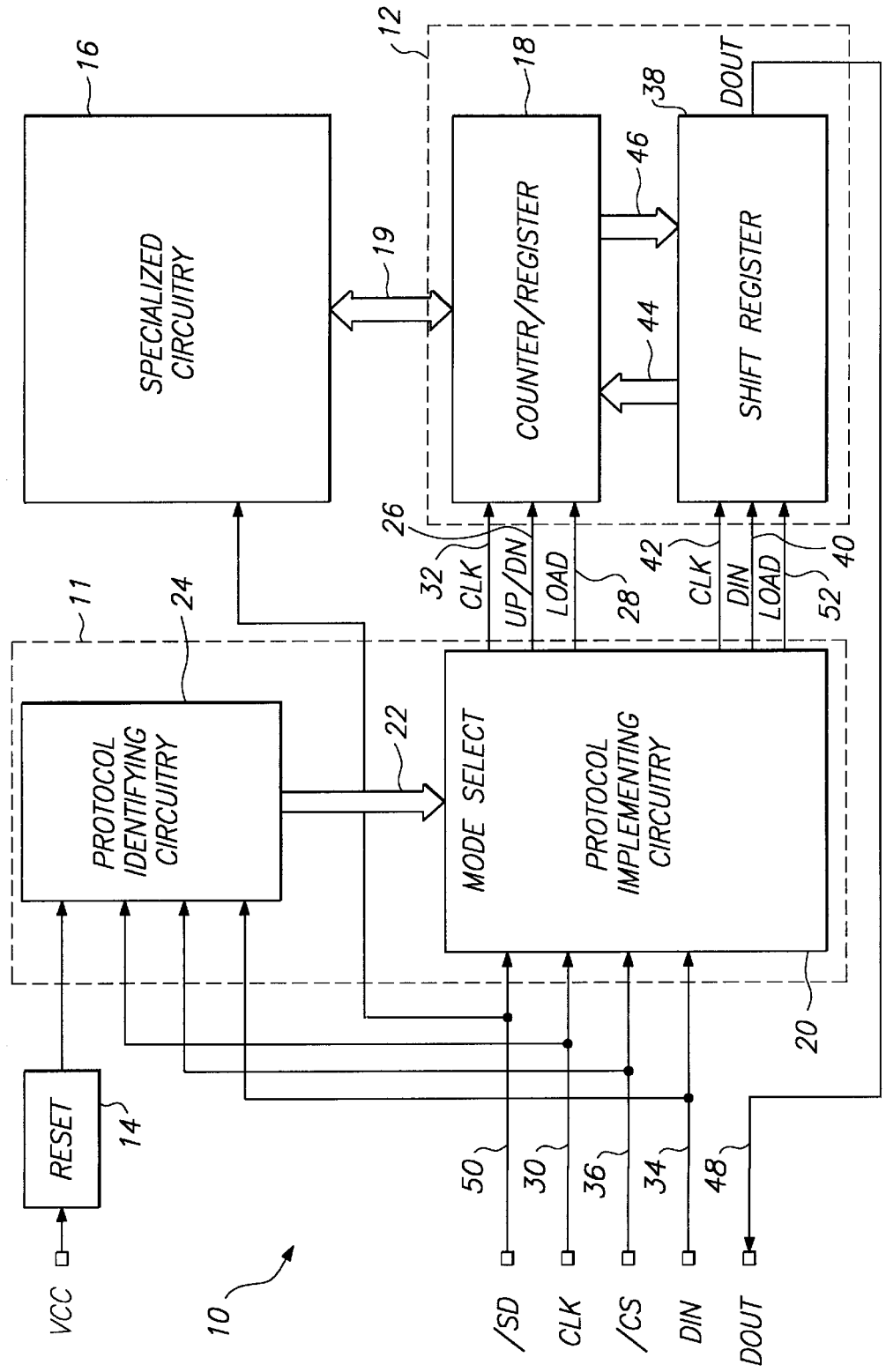
FIG. 1 is a schematic block diagram of interface circuitry incorporating the general principles of the present invention.

FIG. 1 shows a schematic block diagram of the functional units of an integrated circuit 10 having interface circuitry constructed in accordance with principles of the present invention. The functional units comprise serial interface unit 11, control unit 12, reset unit 14, and specialized circuitry 16. Specialized circuitry 16 provides integrated circuit 10 with specific functional capabilities including, for example, circuitry implementing ADC, DAC, RTC, NVRAM, or other functions as dictated by the integrated circuit design. Specialized circuitry 16 communicates with counter/register 18 in control unit 12 via parallel data path 19. The data in counter/register 18 provides information to support the operation of specialized circuitry 16, such as configuration data in the case of a ADC integrated circuit, or a voltage to be generated in the case of an integrated circuit implementing a DAC. Data may also be loaded into register 18 by specialized circuitry 16 to indicate values or status information to be read by a host processor, such data representing, for example, a voltage level measured by an ADC, or the current date and time being maintained by an RTC.

Serial interface unit 11 provides a communications path and protocol for transferring data between register 18 and a host processor or other external circuitry (not shown). Protocol implementing circuitry 20 is capable of using several communications protocols, the specific protocol used being determined by mode select signals 22 from protocol identifying circuitry 24. Protocol identifying circuitry 24 monitors signals received from the host processor and alters the mode select signals in response to changes in the received signals, as is described in more detail hereinbelow.

Reset circuitry 14 provides a reset signal to protocol identifying circuitry 24 which places it and mode select signals 22 into a predetermined state. Following a reset signal the protocol implementing circuitry 20 is configured to use a predetermined protocol. Although the specific connections are not shown in FIG. 1, reset circuitry 14 may also provide the reset signal to other circuitry on integrated circuit 10, such as control unit 12 and specialized circuitry 16, so that the integrated circuit operates in a known configuration following reset. For example, a reset signal supplied to counter/register 18 may cause a default value to be loaded into counter/register 18.

Reset circuitry 14 is shown coupled to supply voltage VCC so that a reset signal is generated following the initial application of power to integrated circuit 10. In addition, reset circuitry 14 may provide a reset signal in response to other conditions, such as special sequencing of various signal lines, or specific data values being transmitted to integrated circuit 10. For example, bringing shut down line (/SD) 50 low while chip select line (/CS) 36 is low may be used as a sequence which causes integrated circuit 10 to be reset. Whereas bringing /SD 50 low while /CS 36 is high may place integrated circuit 10 into a shut down, or low power, mode of operation.

Communication between protocol implementing circuitry 20 and control unit 12 is dependent upon the interface mode selected by mode select signals 22. Protocol identifying circuitry 24 monitors selected signal lines (e.g. lines 30, 34, and 36) between a host processor and integrated circuit 10 to determine the communications protocol being used by the host processor, as is described more fully hereinbelow. Protocol identifying circuitry 24 then generates mode select signals 22 in response to the detected protocol, which in turn determine how signals from the host processor are interpreted and routed to and from registers 18 and 38.

If protocol identifying circuitry 24 is driving mode select lines 22 so as to configure protocol implementing circuitry 20 to use the single wire, increment-only protocol, UP/DN signal 26 is fixed to indicate UP and LOAD signal 28 is not used. Because the host processor has no method to read the value in counter/register 18, counter/register 18 must be set to a default value during circuit reset, so the starting value is known. In order to change the value in register 18, the host processor sends a pulse on CLK line 30 to protocol implementing circuitry 20. In response, protocol implementing circuitry 20 pulses register 18 via CLK line 32 causing the value stored in register 18 to be incremented by a predetermined amount. The incrementing of register 18 may be performed in accordance with the principles of modulo arithmetic, so that when the value in register 18 reaches a maximum possible value, a subsequent CLK pulse causes the value in register 18 to "roll over" to a small value. The particular value at which roll over occurs is determined by the size (i.e. the number of bits) of register 18 and by the step size used to increment the value therein. Specifically, for a register n-bits wide, the maximum value which the register can hold is given by $2^n-1$. For example, an 8-bit register can hold a maximum value of $2^8-1$, which equals 255. Reducing the value stored in counter/register 18 is accomplished by the host processor sending a sufficient number of clock pulses on CLK line 30 to cause the value in register 18 to roll over and then increment up to the desired value. For a counter/register which is eight bits wide, 255 clock pulses are required to effectively decrement the register's value by 1.

As an alternative to using the roll over technique to reduce the value in counter/register 18, an additional signal from the host processor may be used to indicate whether register 18 should be incremented or decremented. According to the principles of the present invention, when protocol identifying circuitry 24 senses that DIN line 34, also referred to as UP/DN line 34, has been driven low, protocol identifying circuitry 24 generates mode select signals 22 to configure protocol implementing circuitry 20 for the increment/decrement protocol (also referred to as up/down mode), wherein subsequent signals on UP/DN line 34 indicate the desired direction of changes to the value in counter/register 18. The signal on UP/DN line 34 is translated by protocol implementing circuitry 20 into a signal on UP/DN line 26. For example, an UP (increment) signal on UP/DN line 26 may correspond to a logic 1 signal on DIN line 34, and a DN (decrement) signal on UP/DN line 26 may correspond to a logic 0 on DIN line 34. As discussed in conjunction with the increment-only mode of operation, the value in counter/register 18 may be incremented or decremented using modulo arithmetic operations, so that the value of the register will roll over from high to low values, or from low to high values depending on the step direction. Alternatively, when using the up/down protocol, further requests to increment or decrement the value of register 18 may be ignored upon reaching, respectively, the maximum and minimum values which register 18 can store. Using the up/down protocol provides the host processor with a more direct method of controlling a value stored in counter/register 18 at the expense of requiring 2 signal lines, CLK and UP/DN (DIN), between the host processor and integrated circuit 10.

The previously described interface techniques provide sufficient means for a processor to communicate data to integrated circuit 10 by incrementing and/or decrementing a value stored in a register within the integrated circuit. It should be noted however, that there is no direct method of loading register 18 with a new value without stepping through all the intermediate values between the previous value of register 18 and the desired new value. For example, if register 18 contained a value of 3, and it was desired to change the value to 7, the methods presented thus far require that register 18 be stepped through the values 4, 5, and 6 before the desired value of 7 is reached. For many applications the increment-only and increment/decrement interfaces may be sufficient, however, in other applications a method of directly loading a data value into counter/register 18 on integrated circuit 10 is needed.

The SPI protocol provides a means for a processor to directly load a value into a register of an integrated circuit as will be described in connection with FIG. 1. A data transfer is begun by the processor asserting a chip select signal on /CS line 36 and placing the first data bit of a data word on DIN line 34. Since CLK line 30 and DIN line 34 may be connected in parallel to multiple integrated circuits, the chip select signal serves the purpose of identifying which integrated circuit is to be involved in the data transfer. After a brief setup period has elapsed, the processor sends a pulse on CLK line 30 to clock the data into integrated circuit 10. Protocol implementing circuitry 20 sends the data signal from DIN line 34, to shift register 38 via DIN line 40 and, in response to clocking pulses on CLK line 30, pulses CLK line 42 to clock the data bit into shift register 38. The processor places each successive bit of the data word to be transferred on DIN signal line 34 and pulses CLK line 30, each pulse on CLK signal line 42 causing the respective bit of the data word to be shifted into shift register 38. The contents of shift register 38 are always present on the data lines of data bus 44. However, the value on data bus 44 is not read by counter/register 18 until a signal on LOAD line 28 is asserted by protocol implementing circuitry 20 which causes the data on data bus 44 to be read and latched by register 18. The load signal on LOAD line 28 may be generated by protocol implementing circuitry 20 when the host processor releases the chip select signal on /CS line 36. Alternatively, protocol implementing circuitry 20 may automatically generate a pulse on LOAD line 28 in response to the host processor clocking in the last bit of the data word.

In an analogous manner to loading a value into register 18, the value of register 18 may be loaded into shift register 38 via data bus 46 in response to a pulse on LOAD line 52. The loaded data may then be shifted out one bit at a time on DOUT signal line 48 in synchronization with clock signals on CLK line 30. Thus the processor may read the data in register 18 by selecting integrated circuit 10, sending clock pulses to integrated circuit 10, and reading the bits on DOUT line 48.

Figure 2:
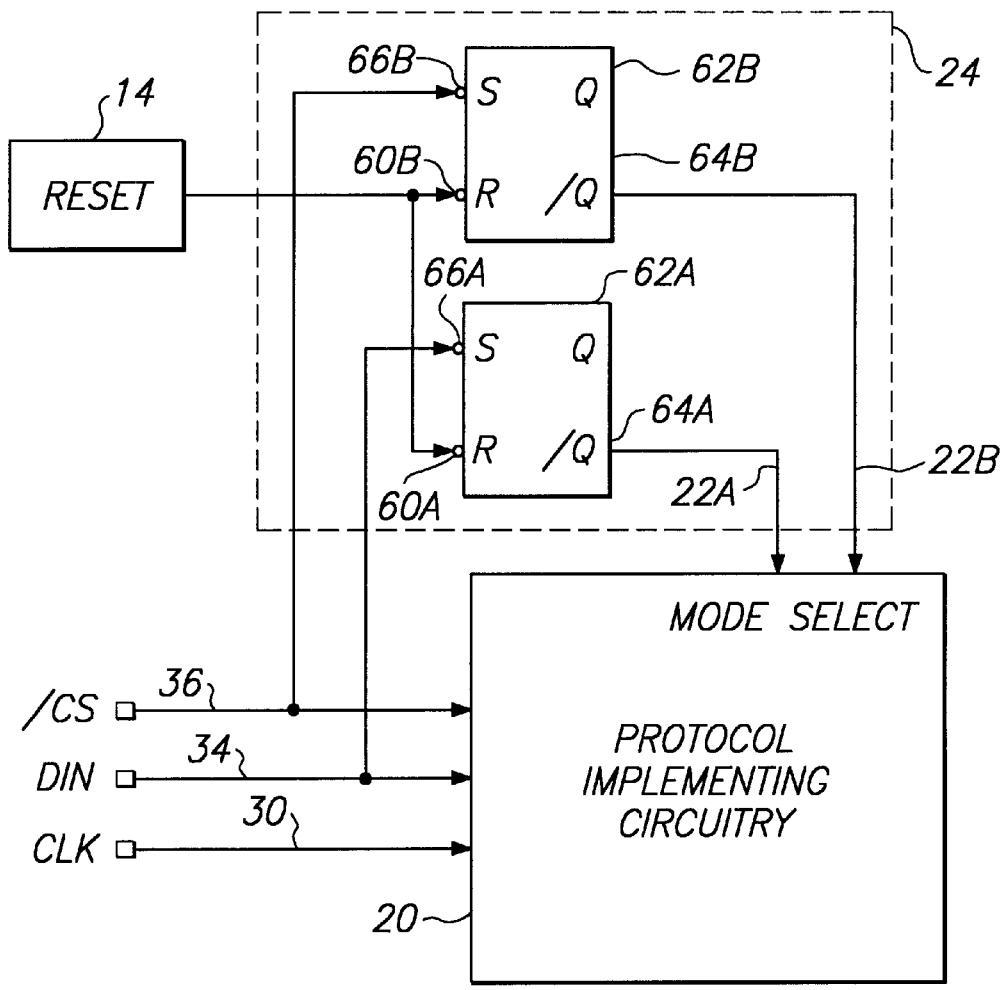
FIG. 2 is a schematic block diagram of an illustrative embodiment of the protocol identifying circuitry of FIG. 1.

Referring now to FIG. 2, the function of an exemplary embodiment of protocol identifying circuitry 24 of FIG. 1 is illustrated in more detail. In the exemplary embodiment of FIG. 2, protocol identifying circuitry 24 comprises a number of latch circuits, or flip-flops, whose outputs provide mode selection signals 22A and 22B to protocol implementing circuitry 20. Reset circuitry 14 is connected to /R (reset) terminals 60A and 60B of SR (set-reset) flip-flops 62A and 62B, respectively. /R inputs 60A and 60B are active low inputs, and have priority over /S inputs 66A and 66B respectively so that flip-flops 60A and 60B are reset in the event both the set and reset inputs of a single flip-flop are asserted concurrently. A low signal supplied to /R inputs 60A and 60B by reset circuitry 14 causes SR flip-flops 62A and 62B to be reset, causing their respective /Q outputs 64A and 64B to be at a high logic level. Thus following a circuit reset signal, mode selection signals 22A and 22B will both be high (i.e. logic 1), which configures protocol implementing circuitry 20 to use the increment-only protocol discussed above in connection with FIG. 1.

DIN line 34 is connected to /S (set) input 66A of SR flip-flop 62A, which is also an active low input. If at any time following a circuit reset, DIN line 34 goes low, flip-flop 62A is "set" and /Q output 64A goes low. A high signal on mode select line 22B and a low on mode select line 22A may therefore be used to configure protocol implementing circuitry 20 to use the up/down protocol when interpreting signals from the host processor. Because SR flip-flop 62A remains in a set state until reset by a low signal on reset input 60A, SR flip-flop 62A effectively remembers that there was a logic low signal on DIN line 34 until the circuit is reset. As a result, a subsequent high signal on DIN line 34 does not alter the output of flip-flop 62A or mode select signal 22A and protocol implementing circuitry 20 remains configured for the up/down protocol.

In an analogous manner, SR flip-flop 62B monitors /CS line 36 and is set in response to a low signal thereon. A logic low signal on mode select line 22B may be used to indicate that the SPI protocol is to be selected. An exemplary mapping from signals on /CS line 36 and DIN line 34, to the states of mode select lines 22A and 22B, and the interface protocol used by protocol implementing circuitry 20 is provided in Table 1 below, wherein the '↓' symbol indicates a high-to-low transition of the signal, and the symbol 'X' represents a "don't care" (i.e. a value of either '0' or '1').

TABLE 1

| input signal | | mode select | | |
| --- | --- | --- | --- | --- |
| DIN | /CS | 22A | 22B | interface protocol |
| 1 | 1 | 1 | 1 | increment-only |
| ↓ | 1 | 0 | 1 | increment/decrement |
| X | ↓ | X | 0 | SPI |

Because of the memory provided by SR flip-flops 62A and 62B, protocol identifying circuitry 24 of FIG. 2 effectively operates in a number of distinct states represented by the rows of Table 1. Protocol identifying circuitry 24 transitions from one state to another in response to the patterns in and the relationships between signals on the selected signal lines being monitored. Transitions from one state to another, may be allowed depending upon whether or not their respective protocols are compatible. For example, the up/down protocol represents a superset of the increment-only protocol and a transition from the state corresponding to the increment-only protocol to the state corresponding to the up/down protocol is allowable. However, the up/down protocol is very different from the SPI protocol, so a transition from the state corresponding to the SPI protocol to the state corresponding to the up/down protocol may not make sense for a particular application and therefore may not be allowed.

While other mappings between mode select signals 22A and 22B and the protocol used by protocol implementing circuitry 20 are possible, the mapping presented in Table 1 is particularly advantageous for use in an integrated circuit implementing the indicated serial protocols. This mapping allows the interface unit 11 to be self-configuring. For example, following a reset, mode selection lines 22A and 22B are both high and protocol implementing circuitry 20 is configured for the increment-only protocol. Thus the host processor only has to supply clock pulses on CLK line 30 to communicate with the integrated circuit device. If however, the host processor desires to use the up/down protocol, it simply sends a low signal on DIN line 34, which will set SR flip-flop 62A. More advantageous still is that a low signal on DIN line 34 corresponds to a decrement operation, so that the first time the processor indicates a decrement operation, protocol implementing circuitry 20 is reconfigured to the up/down mode of operation.

In the preceding discussion, it is assumed that /CS line 36 has been inactive, i.e. at a high logic level, which may be accomplished by either an internal or external pull-up resistor connecting /CS line 36 to VCC. Alternatively, /CS line 36 may be driven high by an I/O pin of the host processor. The first step in using the SPI protocol, is activating /CS line 36 by driving it to a low logic level. As previously discussed herein, a low logic level on /CS line 36 sets SR flip-flop 62B and generates a low signal on mode select line 22B. In accordance with Table 1, a low signal on mode select line 22B configures protocol implementing circuitry 20 to use the SPI protocol. Thus interface unit 11 is automatically configured for the SPI protocol the first time the host processor initiates an SPI transfer by driving /CS line 36 low.

Figure 3:
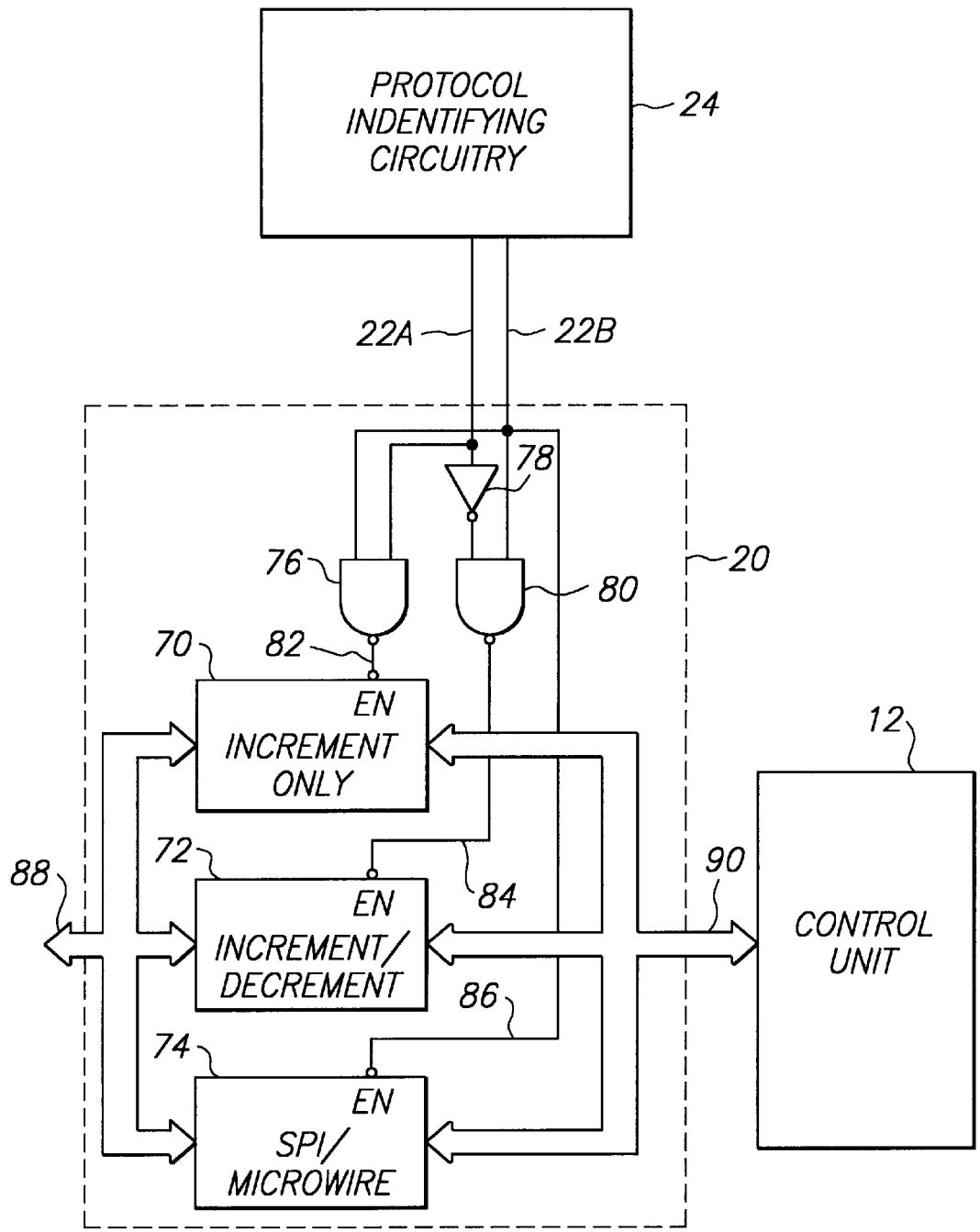
FIG. 3 is a schematic block diagram of an illustrative embodiment of the protocol implementing circuitry of the circuitry of FIG. 1.

Referring now to FIG. 3, the function of mode select lines 22 and of protocol implementing circuitry 20 are described in more detail. Protocol implementing circuitry 20 comprises protocol implementing circuits 70, 72, and 74, which each implement a different one of the protocols recognizable by protocol identifying circuitry 24. Signal bus 88, which comprises signal lines 30, 34, and 36 of FIG. 2, couples protocol implementing circuits 70, 72, and 74 to external devices via pins on integrated circuit 10, while signal bus 90 couples protocol implementing circuitry circuits 70, 72, and 74 to control unit 12 or other internal circuitry (not shown). Combinatorial logic comprising inverter 78 and NAND gates 76 and 80 function to decode mode select lines 22A and 22B and to enable the corresponding one of protocol implementing circuits 70, 72, and 74, by driving low one of enable lines 82, 84, and 86 respectively. For example, when both mode select lines 22A and 22B are high, as after a circuit reset, NAND gate 76 drives enable line 82 low, thus enabling increment-only interface circuitry 70. At the same time, the enable signals for increment/decrement circuitry 72 and SPI circuitry 74 will be high, disabling their respective circuits. If however, mode select line 22A is low, as when protocol identifying circuitry 24 has detected the use of the increment/decrement protocol, the output of NAND gate 76 is high, and the output of NAND gate 80 is low, thus driving enable line 84 low and enabling increment/decrement protocol implementing circuitry 72. Lastly, if mode select line 22B is low, as when the SPI protocol has been detected by protocol identifying circuitry 24, both NAND gates 76 and 80 have high outputs, thereby disabling their respective circuits. Since mode select line 22B is connected directly to enable line 86, if mode select line 22B is low, SPI protocol implementing circuitry 74 is enabled regardless of signals on mode select line 22A.

Figure 4:
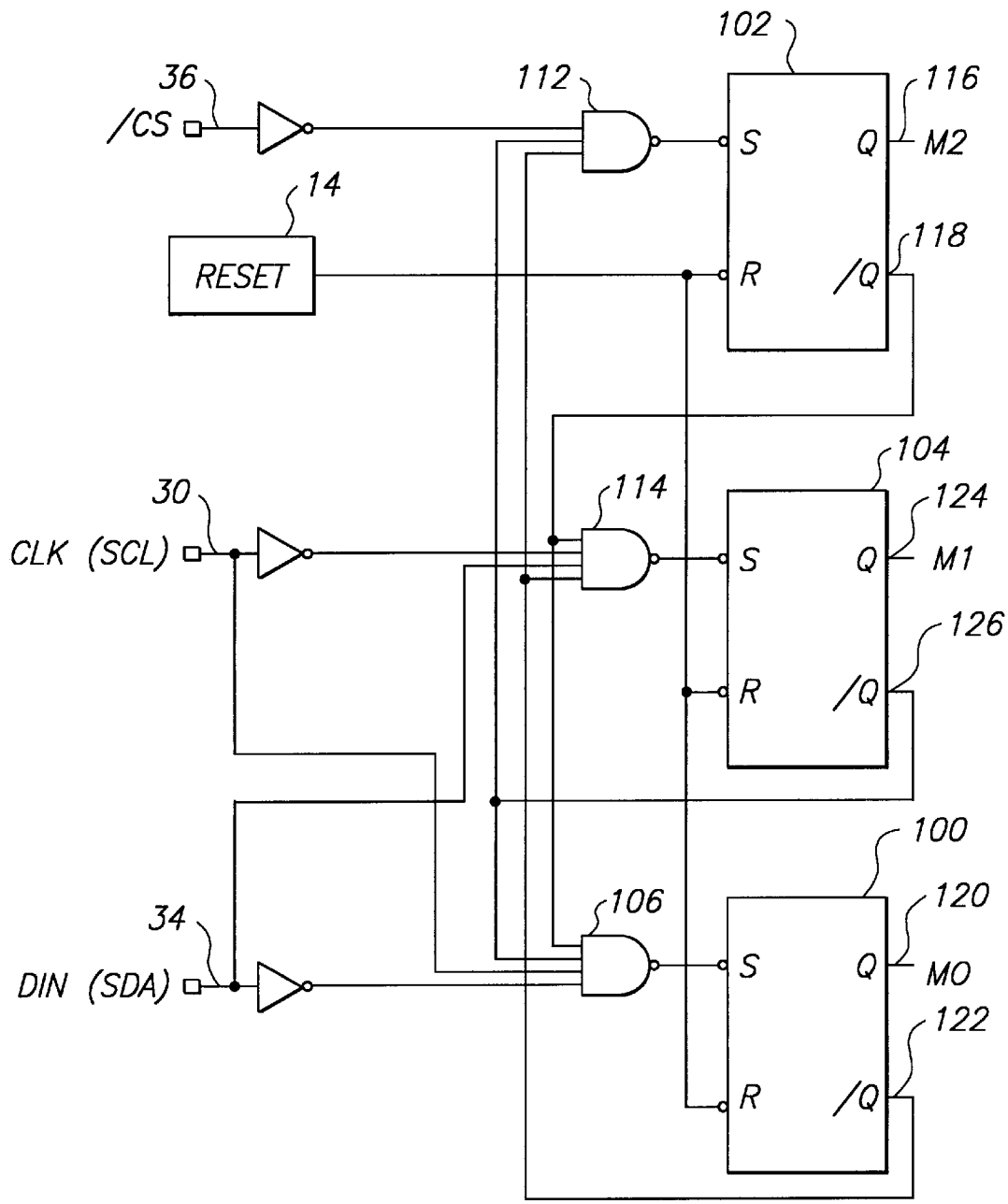
FIG. 4 is a schematic block diagram of another illustrative embodiment of the protocol identifying circuitry of FIG. 1.

Referring now to FIG. 4, another embodiment of protocol identifying circuitry 24 of FIG. 1 is described which identifies the correct protocol from among the I²C, SPI, increment-only, and up/down protocols and automatically configures protocol implementing circuitry 20 of FIG. 1 accordingly. Reset circuitry 14 provides a reset signal to the /R (reset) input of flip-flops 100, 102, and 104, so that following a circuit reset, the Q and /Q outputs of each flip-flop are at a logic low and high respectively. It is also assumed that /CS line 36, CLK line 30, and DIN line 34 are all at a logic high level following a system reset.

In the SPI protocol, /CS line 36 is brought low to signal the beginning of a transaction, and to identify which one of many possible integrated circuits coupled to the serial bus is to participate in the transaction. Of the protocols discernable by the circuitry of FIG. 4, only the SPI protocol drives /CS line 36 low, and a low signal on /CS line 36 may be used as the signature for the SPI protocol. /CS line 36 is inverted and provided as an input to NAND gate 112, along with the /Q outputs of flip-flops 100 and 104. When all the inputs to NAND gate 112 are high, its output goes low to set flip-flop 102. For example, if the /Q outputs of flip-flops 100 and 104 are high, as they are following a system reset, a low on /CS line 36 causes the output of NAND gate 112 to go low, setting flip-flop 102. When set, Q output 116 of flip-flop 102 provides a high signal on mode select line 116, while /Q output 118 of flip-flop 102 provides a low to NAND gates 106 and 114. Because the only signal connected to the /R input of flip-flop 102 is a reset signal from reset unit 14, Q output 116 and /Q output 118 will remain high and low, respectively, until a circuit reset occurs. When /Q output 118 of flip-flop 102 is low the outputs of NAND gates 106 and 114 are forced high, thereby preventing flip-flops 100 and 104, respectively, from ever being set. Thus the first time the processor attempts to communicate with integrated circuit 10 using the SPI protocol, M2 mode select line 116 is driven high to configure protocol implementing circuitry 20 for the SPI protocol.

The I²C bus protocol does not use a chip select signal to identify which integrated circuit device is to participate in a transaction. Rather, address information is serially transmitted onto DIN line 34 (SDA in I²C terminology) with the address identifying the desired integrated circuit. The start condition for a transaction according to the specification of the I²C bus, is a high-to-low transition of SDA line 34, while CLK line 30 (SCL according to I²C) is still high. Thus SDA line 34 going low before SCL line 30 goes low may be used as the signature for the I²C protocol. With SDA line 34 low and CLK line 30 high, NAND gate 106 has a low output which sets flip-flop 100. When flip-flop 100 is set, Q output 120 is high, driving M0 mode select line 118 high, indicating that protocol implementing circuitry 20 should be configured for I²C bus communications. /Q output 122 of flip-flop 100 provides an input to NAND gates 112 and 114, which blocks signals that may set flip-flops 102 or 104.

Lastly, if the host processor brings CLK line 30 low before bringing DIN line 34 low, which may be used as the signature for the up/down protocol, the output of NAND gate 114 goes low, thereby setting flip-flop 104. As discussed in connection with flip-flops 100 and 102, /Q output 126 of flip-flop 104 is used to prevent flip-flops 100 and 102 from being set after flip-flop 104 is set. Thus, subsequent transitions of signals on CLK line 30 or DIN line 34 have no effect on which flip-flop is set. Therefore, when M1 mode select line 124 is high, the processor can use the increment-only or up/down protocol to communicate with the integrated circuit.

Based on the foregoing, in order to interface a processor to an integrated circuit incorporating the circuitry of FIG. 4, a circuit designer connects /CS line 36, CLK line 30, and DIN line 34 of integrated circuit 10 to corresponding signal lines of the host processor to use the SPI protocol. Alternatively, the designer may choose to tie /CS line 36 high to use either the I²C, increment-only, or up/down protocols. In order to configure the integrated circuit for I²C, DIN (SDA) line 34 must be brought low before CLK line 30 is brought low. Since this corresponds to the start condition as defined in the I²C specification, the act of transmitting data to the integrated circuit in accordance with the I²C specification provides the signals necessary to properly configure the integrated circuit for I²C operation. Integrated circuit 10 may be configured for the up/down protocol by bringing CLK line 30 low before bringing DIN (SDA) line 34 low, which may be accomplished by simply requiring the first action of the processor to be sending an increment signal to the integrated circuit. Lastly, the increment only mode can be selected by tying DIN (SDA) line 34 and /CS line 36 high, and only connecting CLK line 30 to the host processor. Table 2 summarizes the mapping from transitions on the input signals, to the mode select signals, and corresponding interface protocol.

TABLE 2

| input signal | | | mode select | | | |
|---|---|---|---|---|---|---|
| /CS | CLK | DIN | M0 | M1 | M2 | interface protocol |
| 1 | 1 | 1 | 0 | 0 | 0 | reset state |
| 1 | 1 | ↓ | 1 | 0 | 0 | I²C |
| 1 | ↓ | 1 | 0 | 1 | 0 | increment only, or increment/decrement |
| ↓ | 1 | 1 | 0 | 0 | 1 | SPI |

The circuitry of FIG. 4 assumes that the configuration process begins from the reset state of integrated circuit 10 and that CLK line 30, DIN line 34, and /CS line 36 are all high. It is further assumed that only one of the three input signals changes at a time. For example, to select the I²C interface protocol DIN line 34 is driven low while CLK line 30 and /CS line 36 remain high. If two or more lines are brought low simultaneously, a race condition occurs, and it is not possible to determine which one(s) of flip-flops 100, 102, and 104 becomes set. Thus Table 2 only contains entries in which only one input signal differs from those of the reset state (i.e. the first row of Table 2).

Figure 5:
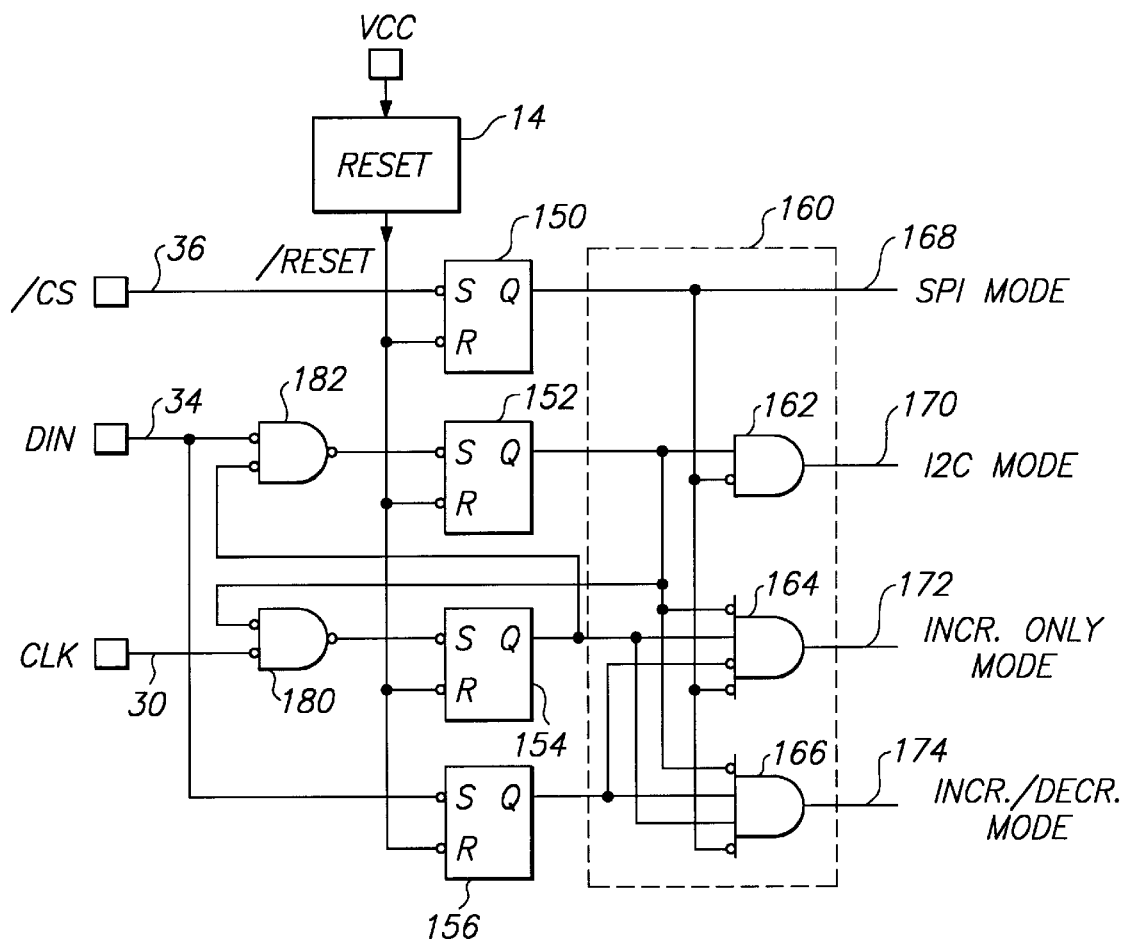
FIG. 5 is a schematic block diagram of an alternative embodiment of the circuitry of FIG. 4.

Referring now to FIG. 5 an alternative embodiment of protocol identifying circuitry 24 of FIG. 1 is described. As in the circuitry of FIG. 4, the circuitry of FIG. 5 is able to distinguish between I²C, SPI, up/down, and increment-only protocols and to provide configuration signals to protocol implementing circuitry 20 of FIG. 1. The primary difference between protocol identifying circuitry 24 of FIG. 5 and that of FIG. 4, is that the circuitry of FIG. 5 switches to SPI mode any time /CS line 36 is driven low, even if the circuitry is already in another mode, advantageously giving the SPI protocol priority over the other interface protocols. In a system having multiple peripheral devices coupled by an SPI bus, the CLK and DATA lines are shared by all the devices on the bus, but each device has a separate /CS line to identify the particular device involved in an SPI bus transaction. Thus the device having its /CS line brought low will be properly configured to use the SPI protocol prior to data being transmitted on the bus. However, other devices on the bus will not have their /CS line brought low, but will see signal transitions on the CLK and DATA lines, and will become configured for one of the other protocols (I²C, increment-only, up/down). The circuitry of FIG. 5 provides logic so these other devices will become configured for the SPI protocol the first time their respective /CS line is brought low, regardless of any prior configuration.

Still referring to FIG. 5, reset circuitry 14 provides a reset signal to flip-flops 150, 152, 154, and 156. As in the circuitry of FIGS. 2 and 4, flip-flops 150, 152, 154, and 156 are designed such that their reset (/R) input has priority over their set (IS) input. When reset, the Q outputs of flip-flops 150, 152, 154, and 156 are low.

Decoding logic 160, which comprises AND gates 162, 164, and 166, is coupled to and fully decodes the outputs of flip-flops 150, 152, 154, and 156 in a manner analogous to the combinatorial logic comprising inverter 78 and NAND gates 76 and 80 of FIG. 3. Decoded outputs 168, 170, 172, and 174 of decoding circuitry 160 provide enable signals to circuitry implementing the respective protocols. AND gates 162, 164, and 166 are coupled so that at most only one of the enable signals is active at any one time. For example, following a circuit reset, flip-flops 150, 152, 154, and 156 are reset, their corresponding Q outputs are low, and all of the enable signals are low. Alternatively, when flip-flop 150 is set, its Q output will be high, and enable line 168, corresponding to SPI mode, will also be high. The Q output of flip-flop 150 is also coupled to inverting inputs of AND gates 162, 164, and 166 so that when flip-flop 150 is set enable lines 170, 172, and 174 will be low.

The lack of gating logic on /CS line 36 of FIG. 5, in combination with the configuration of decoding circuitry 160, causes any low signal on /CS line 36 to set flip-flop 150, thus providing a high signal on its Q output which in turn drives high the enable line corresponding to the SPI protocol. As described above, the Q output of flip-flop 150 is also provided to inverted inputs of AND gate 162, 164, and 166 so that a when flip-flop 150 is set, enable lines 170, 172, and 174 are driven low.

As discussed in connection with FIG. 4, the I²C protocol signature is a high-to-low transition on DIN line 34 while CLK line 30 is still high. Following a circuit reset, the Q output of flip-flops 152 and 154 are low, providing a low signal to an input of OR gates (NAND gates with inverted inputs) 180 and 182 respectively. DIN line 34 also provides a signal to an input of OR gate 182. If both signals at the inputs of OR gate 182 are low, the output of OR gate 182 will be low thereby setting flip-flop 150. Thus a low signal on DIN line 34 while flip-flop 154 is reset will cause flip-flop 152 to set and the Q output of flip-flop 152 to go high. The Q output of flip-flop 152 is provided to an input of OR gate 180 to block signals on CLK line 30 from setting flip-flop 154. OR gate 180 and flip-flop 154 respond to a high-to-low transition on CLK line 30 in a manner analogous to that described above regarding the response of OR gate 182 and flip-flop 152 to transitions on DIN line 34. The cross coupling of the outputs of flip-flops 152 and 154 to the inputs of flips-flops 154 and 152 respectively ensures that only one of the two flip-flop will ever be set.

DIN line 34 is also coupled to flip-flop 156, so that any low signal on DIN line 34 will cause flip-flop 156 to become set. The Q output of flip-flop 156 is only coupled to AND gates 164 and 166 to selectively activate enable lines 172 or 174 corresponding to the increment-only and the increment/decrement protocol modes respectively.

Although the design of a DAC was presented herein as an illustrative embodiment of the principles of the invention, one skilled in the art will recognize numerous other applications for the interface techniques disclosed. For example, LCD drivers, clock/calendars, audio/video switches and amplifiers, television tuners, telephone redialers, and many other digitally controlled circuits may be designed to incorporate multiple serial protocols according to the principles disclosed herein. Furthermore, it is clearly within the skill of one in the art to reverse signal polarities or to substitute other types of flip-flops and logic devices to implement various components of the present invention. In addition, although the disclosed embodiment is described in terms of a specific integrated circuit type device, it is contemplated that the circuitry and techniques of the present invention may be realized as standard cells for use in application specific integrated circuits (ASICs), as configurable logic blocks for use in programmable logic devices, or as microcoded instructions in a microprocessor core. Further still, interface circuitry that may be configured for serial protocols other than the illustrative protocols described herein may be designed using the techniques disclosed herein. For example, interface circuitry may be designed for the "APPLE desktop bus" (ADB) protocol developed by Apple Computer, the "ACCESS.bus" protocol developed by Phil-

TABLE 3

| input | | | Q of flip-flop | | | | outputs | | | | |
|---|---|---|---|---|---|---|---|---|---|---|---|
| /CS | DIN | CLK | 150 | 152 | 154 | 156 | 168 | 170 | 172 | 174 | protocol |
| 1 | 1 | 1 | 0 | 0 | 0 | 0 | 0 | 0 | 0 | 0 | reset |
| ↓ | X | X | 1 | X | X | X | 1 | 0 | 0 | 0 | SPI |
| 1 | ↓ | 1 | 0 | 1 | 0 | 1 | 0 | 1 | 0 | 0 | I²C |
| 1 | 1 | ↓ | 0 | 0 | 1 | 0 | 0 | 0 | 1 | 0 | incr |
| 1 | ↓ | X | 0 | 0 | 1 | 1 | 0 | 0 | 0 | 1 | up/down |

Table 3 summarizes the outputs of the circuitry of FIG. 5 in response to various transitions on the input lines. The last line of Table 3 is only applicable if the circuitry of FIG. 5 is already in a state corresponding to the increment-only protocol, and indicates that if the circuitry is in the increment-only mode a subsequent low signal on DIN line 34 causes the circuitry to shift into the increment/decrement mode.

To configure an integrated circuit device employing the circuitry of FIG. 5, a host microprocessor need only provide the appropriate signals to the integrated circuit device. For example, to configure the integrated circuit device for the SPI communications protocol the microprocessor begins an SPI transmission to the integrated circuit. As part of an SPI transmission /CS line 36 is driven low, causing flop-flop 150 to be set which configures the integrated circuit for the SPI protocol.

To instead use the I²C protocol, an I²C transaction is begun by the microprocessor. As described above, an I²C transaction begins with DIN line 34 being driven low while CLK line 30 is still high. These conditions cause flip-flop 152 to be set, which in turn drives enable line 170 high (provided flip-flop 150 is not set), which corresponds to the I²C mode. Alternatively, if CLK line 30 goes low prior to DIN line 34 going low, flip-flop 154 is set, which drives enable line 172 high. Lastly, a low signal on DIN line 34 also sets flip-flop 156, thus, if flip-flop 154 is already set, a high on the Q output of flip-flop 156 will drive enable line 174 high, thereby enabling the increment/decrement mode of operation.

ips and Digital Equipment Corporation, the "Universal Serial Bus" (USB) protocol developed by Intel and Microsoft, or the System Management Bus (SMBus) protocol developed by Intel and Duracell. These and other variations on the disclosed embodiments are considered to be within the spirit and scope of the present invention.

The specific embodiments disclosed herein are presented for purposes of illustration and not of limitation. One skilled in the art will appreciate that the present invention can be practiced by other than the described embodiments, and that the present invention is limited only by the claims that follow.

What is claimed is:

1. An integrated circuit having a plurality of terminals for communicating signals with another device, the integrated circuit comprising:

interface circuitry configurable to communicate signals with the other device via the plurality of terminals in accordance with any one of a plurality of interface protocols responsive to a mode selection signal; and protocol identifying circuitry coupled to at least one of the plurality of terminals for monitoring at least one time varying signal communicated to the integrated circuit by the other device, and coupled to the interface circuitry for providing the mode selection signal, wherein each of the plurality of interface protocols has a corresponding signature, and the protocol identifying circuitry provides the mode selection signal responsive to detecting an occurrence of any of the signatures in the at least one monitored signal, so that the interface is configured to use the same protocol as that used by the other device to communicate the signals to the integrated circuit.

2. The integrated circuit of claim 1 further comprising reset circuitry for resetting the protocol identifying circuitry to provide a predetermined mode selection signal.

3. The integrated circuit of claim 2 wherein the predetermined mode selection signal corresponds to a predetermined one of the plurality of protocols.

4. The integrated circuit of claim 2, wherein the reset circuitry generates a reset signal responsive to application of power to the integrated circuit, to a signal on a reset terminal, or to a predetermined sequence of signals on the terminals.

5. The integrated circuit of claim 1, wherein the plurality of terminals comprises at least two terminals, and wherein a signature comprises a predetermined sequence of transitions of the signals on the at least two terminals.

6. The integrated circuit of claim 5, wherein a predetermined sequence of transitions of signals on the at least two terminals comprises which of the signals on the at least two terminals exhibits a transition first.

7. The integrated circuit of claim 1, wherein the protocol detection circuitry comprises latch circuits.

8. The integrated circuit of claim 1, wherein the plurality of terminals comprise chip select, clock, and data input terminals.

9. The integrated circuit of claim 8, wherein the protocol identifying circuit comprises first and second latches coupled to the chip select and data input terminals respectively.

10. The integrated circuit of claim 8, wherein the plurality of interface protocols comprises the increment-only, increment/decrement, and SPI protocols.

11. Circuitry for providing a protocol selection signal in an integrated circuit, wherein the integrated circuit includes a plurality of terminals adapted to receive signals from at least one other device and circuitry to process the received signals in accordance with a protocol selected from a predetermined plurality of protocols responsive to the protocol selection signal, the circuitry comprising:

an input path coupled to at least one of the plurality of input terminals, the input path being adapted to receive the signals from the at least one other device; and latching circuitry, coupled to the input path, which monitors the signals from the at least one other device to detect the occurrence of a signature indicative of any one of the plurality of protocols, the latching circuitry providing the mode selection signal corresponding to the protocol indicated by the detected signature.

12. The circuitry of claim 11, further comprising latching circuitry, including a plurality of latches coupled to the input path and output path, each latch having an input and an output.

13. The configuration circuitry of claim 12, wherein the output of at least one of the plurality of latches is coupled to the input of at least one of the other latches comprising the plurality of latches.

14. A method for selecting an interface protocol in an integrated circuit having interface circuitry operable in accordance with a predetermined plurality of interface protocols, the integrated circuit including at least one input terminal, the method comprising the steps of:

accepting input signals from another device on the at least one input terminal, wherein the input signals are transmitted by the other device in accordance with a desired interface protocol;

analyzing the input signals to determine a signature which corresponds to one of the plurality of predetermined interface protocols;

providing a selected enable signal from a plurality of enable signals in response to the determined signature, the selected enable signal corresponding to the interface protocol corresponding to the determined signature; and selecting one of the plurality of predetermined interface protocols responsive to the selected enable signal; whereby the desired protocol is selected from the plurality of predetermined protocols.

15. The method of claim 14, wherein the integrated circuit has an output terminal and circuitry which processes signals for transmission via the output terminal in accordance with the selected one of the plurality of predetermined protocols.

16. The method of claim 14 wherein the step of analyzing the input signals determines a signature corresponding to one of the increment-only, increment/decrement, and SPI protocols.

17. The method of claim 14 further comprising the step of repeating the steps of accepting the input signals through the step of selecting one of the plurality of predetermined protocols in sequence.

18. The method of claim 14, further comprising the step of fixing the enable signal to the selected enable signal, such that the enable signal remains constant until the interface circuit is reset.

19. A method for configuring interface circuitry of an integrated circuit to use a protocol selected from a predetermined plurality of protocols to communicate signals with another device, the method comprising the steps of:

determining a signature which distinguishes each specific protocol in the predetermined plurality of protocols;

monitoring at least one of the signals received by the interface circuitry to detect any of the signatures;

altering a state of the configuration circuit responsive to detecting any of the signatures; and providing a configuration signal responsive to the state of the configuration circuit, wherein the configuration signal configures the interface circuitry to use the protocol corresponding to the signature detected in the at least one of the signals being monitored.

20. The method of claim 19, wherein the steps of monitoring the at least one signal, altering the state of the configuration circuit, and providing the configuration signal are repeated sequentially.

21. The method of claim 19 further comprising the step of preventing further alterations in the state of the configuration circuit after the step of altering the state of the configuration circuit.

22. The method of claim 19 wherein the step of determining a signature comprises determining a signature for one of the increment-only, increment/decrement, and SPI protocols.

23. An interface circuit for an integrated circuit having a plurality of input terminals, the interface circuit comprising:

means, coupled to the plurality of input terminals, for processing signals received via the plurality of input terminals in accordance with a selected one of a plurality of interface protocols as determined by a mode selection signal; and means, coupled to at least one of the plurality of input terminals for monitoring at least one time varying signal received thereon, and coupled to the processing circuitry for providing the mode selection signal responsive to the detection of a signature within the at least one monitored signal on the at least one input terminal indicative of a specific one of the plurality of protocols.

24. The interface circuit of claim 23 further comprising means for resetting the protocol identifying circuitry to provide a predetermined mode selection signal corresponding to a predetermined one of the plurality of protocols.

25. The interface circuit of claim 23, wherein the means for resetting the protocol identifying circuitry comprises a power on reset means.

26. The interface circuit of claim 23, wherein the plurality of input terminals comprises at least two input terminals, and wherein the means for monitoring signals comprises means for monitoring transitions in signals on the at least two input terminals.

27. The interface circuit of claim 26, wherein the means for monitoring transitions in signals on the at least two input terminals comprises means for determining the sequence of the transitions in the signals on the at least two input terminals.

28. The interface circuit of claim 23, wherein the means for providing the mode selection signal comprises latch means.

29. The interface circuit of claim 23, wherein the input terminals comprise chip select, clock, and data input terminals.

30. The interface circuit of claim 29, wherein the means for providing the mode selection signal comprises first and second latching means coupled to the chip select and data input terminals respectively.

31. The interface circuit of claim 29, wherein the plurality of protocols comprises at least one of the increment-only, increment/decrement, and SPI protocols.

32. Configuration circuitry for providing a mode selection signal to an interface circuit of an integrated circuit for configuring the interface circuit to use a selected one of a plurality of interface protocols, wherein the integrated circuit includes a plurality of terminals adapted to receive signals from at least one other device, the configuration circuitry comprising:

input means coupled to at least one of the plurality of input terminals, the input means being adapted to receive input signals;

an output means coupled to the interface circuitry; and latching means, coupled to the input means which monitors the input signals for a signature indicative of a specific one of the plurality of protocols, the latching means also being coupled to the output means to provide the mode selection signal to the interface circuitry.

33. The configuration circuitry of claim 32, wherein the latching means comprises a plurality of latches coupled to the input means and output means, each latch having an input and an output.

34. The configuration circuitry of claim 33, wherein the output of at least one of the plurality of latches is coupled to the input of at least one of the other latches comprising the plurality of latches.

35. Interface circuitry for an integrated circuit having an input terminal, wherein the interface circuitry is operable in accordance with a selected one of a predetermined plurality of protocols responsive to a mode selection signal, comprising:

decoding circuitry which provides a selected enable signal from a plurality of enable signals corresponding to the predetermined plurality of protocols, responsive to the mode selection signal; and protocol implementing circuits coupled to the input terminal and to the decoding circuitry, each protocol implementing circuit processing signals received at the input terminal in accordance with at least one of the predetermined plurality of protocols, wherein each protocol implementing circuit is enabled responsive to the selected enable signal.

36. An interface circuit for an integrated circuit having a plurality of input terminals including chip select, data input, and clock terminals, the interface circuit being operable in accordance with any one of the increment-only, up/down, and SPI interface protocols, the interface circuit comprising:

interface circuitry coupled to the plurality of input terminals, wherein the interface circuitry processes signals received via the plurality of input terminals in accordance with one of the increment-only, up/down, and SPI interface protocols as determined by a mode selection signal;

protocol identifying circuitry comprising latch circuits coupled to at least the data input terminal for monitoring signals thereon, and coupled to the interface circuitry for providing the mode selection signal responsive to the detection of a signature within the monitored signals on the data input terminal indicative of a specific one of the increment-only, up/down, and SPI interface protocols; and reset circuitry for resetting the protocol identifying circuitry to provide a predetermined mode selection signal.

37. The interface circuit of claim 36 wherein the predetermined mode selection signal corresponds to a predetermined one of the increment-only, up/down, and SPI interface protocols.

* * * * *